F. J. GLEASON.
METHOD OF COATING LEATHER WITH FABRIC.
APPLICATION FILED JULY 27, 1907.
921,229.
Patented May 11, 1909.
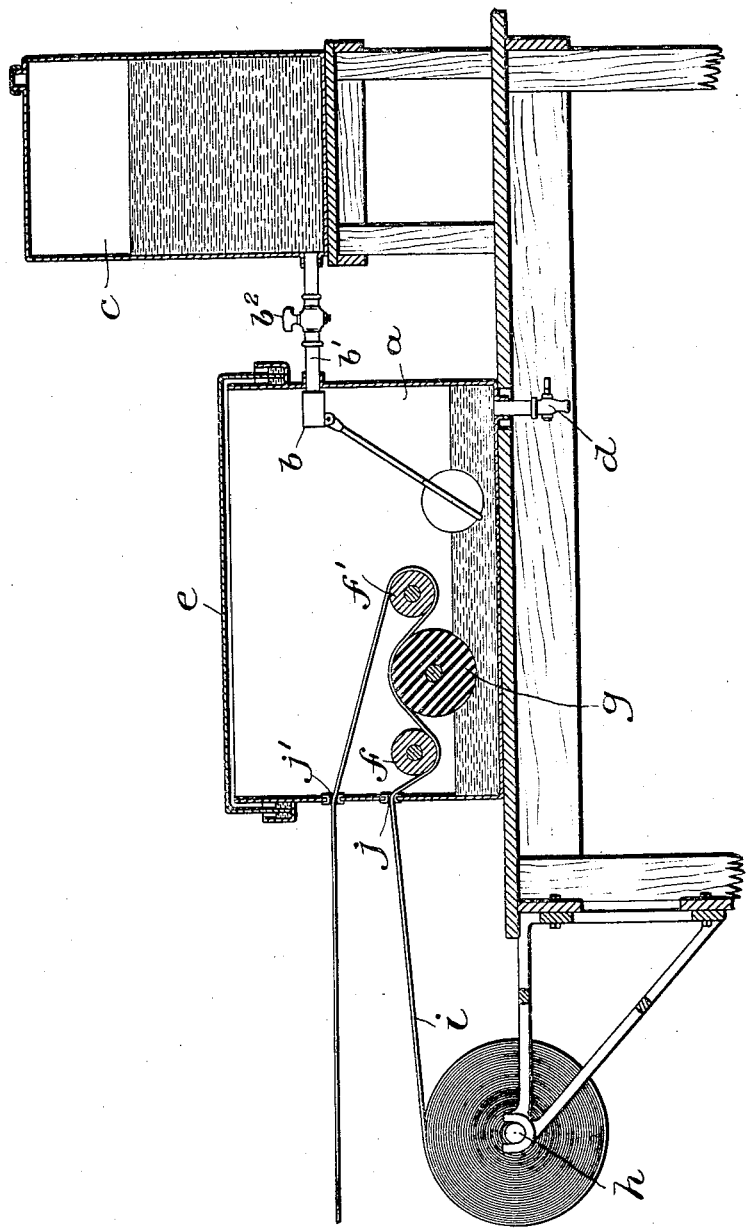
Witnesses:
Inventor:

UNITED STATES PATENT OFFICE.

FREDERICK J. GLEASON, OF WALPOLE, MASSACHUSETTS, ASSIGNOR TO MASSACHUSETTS CHEMICAL COMPANY, OF WALPOLE, MASSACHUSETTS, A CORPORATION OF MAINE.

METHOD OF COATING LEATHER WITH FABRIC.

No. 921,229.         Specification of Letters Patent.         Patented May 11, 1909.

Application filed July 27, 1907. Serial No. 385,861.

*To all whom it may concern:*

Be it known that I, FREDERICK J. GLEASON, of Walpole, in the county of Norfolk and State of Massachusetts, have invented certain new and useful Improvements in Methods of Coating Leather with Fabric, of which the following is a specification.

This invention has relation, generally speaking, to the manufacture of various articles in which a cement containing rubber or rubber compounds is employed to secure fabric to leather.

The object of the present invention is to provide a process by means of which such cement may be rendered highly adhesive after it has once become dry and substantially non adhesive, and a cement-coated fabric may be caused to adhere firmly to a surface of leather. It has already been proposed to accomplish this by the agency of heat either by passing articles coated with such cement over a heated surface, or by passing them through a heated substance such as water. Either method of reducing the cement to an adhesive state has inherent faults. Where the material is passed over a heated surface and the cement is softened or rendered adhesive by the heat, it radiates heat rapidly, and unless the material is quickly manipulated or used, it becomes useless or else must be reheated. On the other hand, where the material is passed through a heated liquid bath, the cement is coated more or less with moisture which prevents its adhering satisfactorily when the article is manipulated or used for the purposes for which it is desired. For instance in the manufacture of inner soles of the "Gem" type, so called, in which a layer of canvas or duck is attached to the face of a leather inner sole, it is customary to spread upon the face of the fabric, a layer or coating of a cement containing rubber, gutta percha, or some other compound of the caoutchouc family, and then to press the fabric upon the inner sole and cut it to shape. A rubber cement when dried, is not adhesive so that, as previously stated, the coated fabrics have been rendered adhesive by heating the cement as previously indicated.

In accordance with my invention, I propose to dispense with the employment of a heating agency in rendering the compound adhesive, and to employ a solvent which acts upon the caoutchouc to soften it and render it extremely sticky or adhesive without however exerting any vulcanizing action. Preferably a solvent is used which possesses the described characteristics in its action upon rubber when it is at the normal atmospheric temperature. I find that I can secure the best results by employing as a solvent, tetrachlorid of carbon which, not being inflammable, may be used with safety in factories, may be obtained in commercial quantities at a relatively slight expense, may be handled without danger to the operatives, and being free from the vulcanizing effect characteristic of carbon disulfid or sulfur chlorid yields much better results. Such solvents as carbon disulfid or sulfur chlorid, being capable of exerting a vulcanizing action, do not render the previously dried rubber film sufficiently tacky, or permit it to remain in such condition for a sufficient period. Furthermore such compounds give a blooming effect due to the separation of sulfur which interferes seriously with the adhesion. Carbon tetrachlorid and equivalent solvents possess the additional advantage for securing fabric to leather that rubber solutions in such solvents permeate the leather with extreme readiness and thereby produce a firmer and more stable bond than is obtainable from rubber rendered tacky by heat.

On the accompanying drawing I have illustrated a manner of carrying out my process in the manufacture of so called rubber goods, or in the manufacture of Gem inner soles.

Referring to the accompanying drawing, $a$ indicates a tank for containing the solvent which is supplied thereto through a float valve from an initial receiving tank $c$. As a matter of convenience, the pipe $b'$ which leads from the tank $c$, is provided with a stop cock $b^2$, and leading from the bottom of the tank $a$ is a drip cock $d$. The cover $e$ of the tank $a$ is illustrated as luted to prevent evaporation of the solvent therein contained. Within the tank I place two idler rolls which are indicated at $ff'$. These not being in contact with the solvent, may be made of any suitable material such as wood, steel, brass or the like, although I preferably employ brass in their manufacture. Between the idlers and partially immersed in the solvent is the applying roll $g$. This roll is made of a material which is not attacked by the solvent, the material which I employ being gelatin.

h represents a reel upon which is wound a layer of fabric i which may be of the nature of canvas, duck, drilling or any other material which is initially coated or covered with a layer of rubber, gutta percha, or any compound containing rubber. The layer is drawn through apertures j into the tank and is passed under the rolls f f', and over the roll g, passing from the tank through an aperture j'. From the tank a, the strip is drawn by hand to a suitable bench where the fabric is manipulated, and where it is attached to the face of an inner sole. As the fabric is drawn through the tank, the roll g is rotated by its engagement with the periphery thereof, and carries into contact with the coating on the fabric, a suitable quantity of the solvent to render the same highly adhesive or sticky. Though I have described the particular means by which the solvent may be applied to the cement coated face of the fabric, it will be understood that it is quite immaterial to the present invention what form of apparatus is employed for this purpose, and that the invention is not limited to any particular apparatus which may be employed in following it out.

I have stated that I employ as a solvent, tetrachlorid of carbon. I have found that I may combine with it, more or less of other solvents such as benzol, its homologues or derivatives, turpentine, petroleum-naphtha or other hydrocarbon solvents, and where the proportions of the added ingredients are not too great, the tetrachlorid of carbon renders the compound substantially inflammable. One of the advantages which result from the employment of a solvent such as set forth in rendering rubber or rubber compounds adhesive, is that the fabric may be initially coated with less trouble and less expense than heretofore for the reason that but one coat may be applied which need not be cured, but which may have a temporary facing of talc or the like which is washed off by the solvent when the fabric is subsequently rendered adhesive. Thus the coating itself may be thicker and more adhesive than at present.

What I claim is:—

1. The herein described method of coating leather with fabric, which consists in providing the fabric with a coating of rubber or rubber compound, then subjecting said coating to the action of a rubber solvent free from sulfur, and finally uniting the fabric to the leather.

2. The herein described method of coating leather with fabric, which consists in providing the fabric with a coating of rubber or rubber compound, then subjecting said coating to the action of carbon tetrachlorid, and finally uniting the fabric to the leather.

In testimony whereof I have affixed my signature, in presence of two witnesses.

FREDERICK J. GLEASON.

Witnesses:
CHARLES H. SMITH,
KENNETH R. ELWELL.